UNITED STATES PATENT OFFICE 2,603,627

LUBRICATING OIL ADDITIVE MATERIALS PREPARED BY CONDENSING ALKYL HALIDES WITH HALOAROMATIC-ALIPHATIC HYDROCARBON COPOLYMERS

John D. Garber, Cranford, and David W. Young, Roselle, N. J., assignors to Standard Oil Development Company, a corporation of Delaware No Drawing. Application March 6, 1948, Serial No. 13,536

7 Claims. (Cl. 260—87.5)

This invention relates to novel oil compositions containing a particular type of viscosity index improving agent, and more especially the invention relates to mineral lubricating oil compositions containing special high molecular weight copolymers of a lower olefin and a polymerizable mono-olefinic haloaromatic compound, for example a copolymer of isobutylene and parachlorstyrene.

It has been known for some time (see U. S. Patent 2,084,501) that isobutylene can be polymerized at low temperatures, e. g. —10° C. to —100° C. or lower, by means of a Friedel-Crafts catalyst such as $BF_3$ or $AlCl_3$, to high molecular weight oil-soluble chain type polymers having molecular weights ranging from 1000 to 400,000 or more, preferably about 5000 to 100,000 or so, which when dissolved in mineral lubricating oil, have the property of increasing the V. I. (viscosity index) thereof. One difficulty, however, with such polymers, is that they do not have a high enough viscosity index ceiling when added to paraffinic lubricating oils; for instance in a refined paraffinic lubricating oil base stock having a V. I. of 112, a small amount of polybutene will raise the V. I. up to about 135, the amount required being somewhat indirectly proportional to the molecular weight, but no matter how much polymer is added, the viscosity index cannot be raised above about 135, this being called the V. I. ceiling for polybutene blends in such a paraffinic oil base stock.

It has also been disclosed (in U. S. Patent 2,274,749) that polymerizable aromatic materials such as styrene may be copolymerized with isobutylene in the same type of low temperature Friedel-Crafts process, and that the resulting copolymers may be used as viscosity index improvers for lubricating oils; however, the reported results do not show much improvement over simple isobutylene polymers insofar as V. I.-increasing effect is concerned. It has also been shown that a number of different types of polymers can be fluorinated and the resulting products added to lubricating oils; however, many halogenated polymers are insoluble in lubricating oils, especially in paraffinic mineral lubricating oils, and most chlorinated aliphatic polymers have corrosive tendencies when used as lubricating oil additives.

It has now been discovered that valuable lubricant compositions can be prepared by blending with a mineral lubricating oil base stock a high molecular weight substantially saturated copolymer of a major proportion of a lower olefin such as isobutylene, with a minor proportion of a polymerizable mono-olefinic haloaromatic compound, such as chlorstyrene or a bromstyrene.

Several advantages accrue to the halogenated copolymer as compared with the unhalogenated product disclosed in U. S. Patent 2,274,749. For example, the halogenated product is more soluble. Thus, it is possible to have a higher concentration of copolymer in a hydrocarbon oil without turbidity. Furthermore, due to thickening effect of a higher V. I. ceiling as obtained with the halogenated product than with the unhalogenated product for a given molecular weight.

Instead of isobutylene, other iso-olefins may be used such as an isoamylene (particularly 2-methyl butene-1), iso-octylene, etc., as well as other aliphatic olefins such as ethylene, propylene, normal butylene, octene-1, dodecene-1, octadecene-1, etc.

As the halogen-substituted polymerizable aromatic compound, one may use parachlorstyrene, parabromstyrene, parafluorstyrene, alpha methyl parachlorstyrene, m-chlorstyrene, o-fluorstyrene, m-fluorstyrene, or other monohalogen substituted styrene, or mixed products containing an average of about 1 halogen atom per molecule. Also, dihalogen-substituted styrenes may be used, such as 2-5-dichlorstyrene, 2-5-dibromstyrene, 3-4-dichlorstyrene, or mixed products containing an average of 2 halogen atoms per molecule. Small amounts of tri- or even higher halogen-substituted styrenes may be used. Other halogen substituted polymerizable aromatic compounds may also be used, such as chlorindene, chlorinated dihydronaphthalene, etc.

The proportions of copolymerization reactants to be used, may be varied to some extent according to their nature, but generally the proportion of haloaromatic compound should be about 1–30% by weight if a monohalogen compound is used, and preferably about 5–20%, but should be somewhat lower such as 0.5–15% in the case of a dihaloaromatic compound, e. g. a dichlorstyrene, in this case the preferred proportions being about 2–10%, and even a smaller amount, e. g. about 0.3–10%, preferably about 1–5% in the case of a trihalogenated aromatic compound. In other words, the general guide for determining the amount of haloaromatic compound to be used is that the arithmetic product of the per cent haloaromatic compound times the number of halogen atoms in the molecule should equal about 1–30, preferably about 5–20. The reason for this rule or guide is that the monohalogen aromatic compounds are more soluble in the reaction mixture and copolymerize more readily than the corresponding di-, tri-, or higher halogenated aromatic compounds. In the case of these di- or higher halogenated materials, it is often desirable to use, as copolymerization feed, a ternary mixture containing the desired minor proportion of di- or higher halogenated aromatic compound, a major proportion of isobutylene or other lower olefins, and, as a mutual solvent and copolymerization assistant, a minor amount of an unhalogenated polymerizable mono-olefinic aromatic compound such as styrene per se, alpha methyl styrene, indene, dihydronaphthalene, etc. or a monohalogen substituted derivative thereof. In such a case, the proportion of unhalogenated or monohaloaromatic compound should generally be about 1–5 parts by weight for each 1 part by weight of di- or higher halogenated aromatic compounds.

The copolymerization is carried out under the general conditions described in U. S. Patent 2,274,749, but for the purposes of the present invention, the copolymerization should be carried out at temperatures below −50 C., preferably below −70° C., e. g. −78° C., the temperature obtained when using solidified carbon dioxide as internal or external refrigerant, or −103° C. as obtained when using liquefied ethylene as refrigerant, and the copolymerization should also be carried out in the presence of a lower alkyl halide solvent, such as methyl chloride, ethyl chloride or methylene chloride, using about 1 to 10 volumes of such solvent per volume of liquid reactant. In order to effect the copolymerization, one may use either aluminum chloride or boron fluoride or other Friedel-Crafts catalyst, e. g. $AlBr_3$, $TiCl_4$, etc., or various mixed catalysts, e. g. $AlBr_2Cl$, $AlCl_2Br$ etc., or various catalyst complexes such as $BF_3$-dichloroethyl ether complex etc. Some of these catalysts, such as $AlCl_3$, are advantageously used in the form of a solution thereof in a solvent such as a lower alkyl halide, e. g., methyl chloride, ethyl chloride, and the like, this solution preferably being made by dissolving the $AlCl_3$ in the solvent at the boiling point of the solvent or at room temperature or slightly elevated temperature, then cooling the resulting solution to or near the desired copolymerization temperature. A gaseous catalyst such as $BF_3$ may be used either in the gaseous state by bubbling it through the reaction liquid, or may be used as a solution which may be made by bubbling the $BF_3$ into a solvent such as methyl chloride or ethyl chloride and then cooling the solution to the desired copolymerization temperature.

In carrying out the copolymerization reaction, various procedures may be used, for instance one of the simplest methods is to mix the two or more reactants and the inert solvent, and then add the catalyst.

After the copolymerization reaction has been completed, which generally requires only a few minutes, residual catalyst is hydrolyzed and removed by adding to the reaction mixture a substantial amount, such as about 1/100 ( to deactivate the catalyst) to 10 (to also precipitate the polymer) volumes of a lower alcohol such as methyl or isopropyl alcohol, etc., or water or aqueous caustic soda, or mixtures thereof, per volume of reaction liquid, after which the product is then washed one or more times with water either as the original reaction mixture or dissolved in naphtha, benzene, etc. and completely separated from hydrolyzed catalyst, and finally the copolymer is separated from the solvent used during the reaction or the naphtha or benzene subsequently added, this final separation being accomplished either by distillation or by precipitation if the polymer had not previously been precipitated during the catalyst hydrolysis step.

If desired, a small amount of lubricating oil base stock may be added to the copolymerization reaction mixture either before or during but preferably after the copolymerization, but before separation of the volatile solvent from the copolymer, in order to avoid subsequently having to dissolve a dry copolymer in the lubricating oil base stock; this procedure facilitates the later incorporation of the copolymer into the final blend oil composition, because the concentrated solution containing about 10–50% or so of copolymer in a mineral oil base stock can readily be blended with a larger amount of mineral oil with a relatively light stirring.

The petroleum hydrocarbon fraction with which the above-described haloaromatic-olefin copolymer is to be compounded, may be any of the substantially non-volatile liquid or solid petroleum fractions. For lubricating purposes, which is the primary objective of this invention, the base stock should be a mineral lubricating oil derived from any of the normally available crude petroleum sources, such as paraffinic, naphthenic or mixed base crudes, and the lubricating oil fraction used may have been separated or refined by any of the various methods known to the art, such as distillation, solvent extraction, etc., and may have been subjected to various purification treatments, such as clay contacting, acid treating, soda washing, etc., or any combination of these or other known refining treatments. For special purposes such as for preparing hydraulic oils, etc., it is desirable to use a mineral oil base stock of a lighter boiling range, such as a gas oil. On the other hand, it is also feasible to apply the invention to heavier petroleum oils, such as cylinder oils, bright stock, etc., as well as normally solid petroleum fractions, such as asphalt, paraffin wax, petrolatum, etc.

The invention will be better understood from a consideration of the following experimental data:

EXAMPLE 1

10% by weight of parabromostyrene was mixed with 90% by weight of liquid isobutylene, and 500 ml. of the resulting mixture was diluted with 1500 ml. of pure methyl chloride. This reaction mixture was then placed in a 4 liter copper reactor which was held in a Dewar flask. Liquid ethylene (about 2 liters) was added to the Dewar flask to act as an external refrigerant. When the temperature of the active feed had reached −101° C., $AlCl_3$ catalyst solution consisting of 0.5 g. $AlCl_3$/100 ml. $CH_3Cl$ was added for three minutes at 28 cc. per minute. After a period of 10 minutes, the catalyst was killed by the addition of 50 ml. of dry isopropyl alcohol. The copper reactor was removed from the liquid ethylene; after the methyl chloride had evaporated the polymer was removed, washed with water, and air dried.

A chemical analysis of the copolymer showed 4.5% of bromine (by Parr Bomb analysis), which indicated that the parabromstyrene had copolymerized with the isobutylene in about 10% concentration, substantially the same proportions as in the feed stock. The copolymer had an average Staudinger molecular weight of about 40,000, and an intrinsic viscosity in toluene of about 1.2.

This bromstyrene-isobutylene copolymer was dissolved at 130° F. in several concentrations in a paraffinic solvent-refined mineral lubricating oil base stock having a viscosity of 43 sec. Saybolt Univ. at 210° F. and 113 V. I. (viscosity index). Viscosity and V. I. data on the blends are shown in the following table, the V. I. of a polybutene being given for comparison.

Table I

| Percent Copolymer | Viscosity (c. s.) | | V. I. | V. I. of Polybutene [1] |
|---|---|---|---|---|
| | 100° F. | 210° F. | | |
| 0 | | | 113 | 113 |
| 0.75 | 50.2 | 8.4 | 137 | 125 |
| 1.50 | 69.0 | 12.13 | 145 | 129 |

[1] Polybutene of 45,000 mol. wt. made at −78° C.

The above data show that the parabromstyrene-isobutylene copolymer is quite unexpectedly superior to a corresponding polybutene in regard to viscosity index improving characteristics in a paraffinic mineral lubricating oil. It should be noted that not only are the V. I. improving properties greater, but also the V. I. "ceiling" is substantially higher, because, as previously pointed out the V. I. ceiling of polybutene (regardless of molecular weight and concentration) is in the general vicinity of 135 in such a paraffinic lubricating oil; the corresponding ceiling for styrene-isobutylene copolymers made with 5, 10, and 20% styrene at −101° C., appears to be about 140–142. The parabrom copolymer gave a V. I. of 145 when used in a concentration of only 1.5%.

EXAMPLE 2

A tripolymer was made by copolymerizing a mixture of 70 gms. of liquid isobutylene, 25 gms. of styrene, and 5 gms. of dichlorostyrene which was a commercially obtained mixture probably containing a major proportion of 2–5 dichlorostyrene. These reactants were diluted with 750 ml. of methyl chloride and the reaction mixture was then polymerized at −90° C. by feeding into the mixture for 4 minutes a catalyst solution, consisting of 0.5 gm. of AlCl₃ per 100 ml. of methyl chloride, at the rate of 28 cc. per minute. The resulting copolymer was recovered by the same procedure as in Example 1 and was found to have an average molecular weight of about 41,000 and an intrinsic viscosity of about 1.0.

This styrene - dichlorstyrene - isobutylene tripolymer was then blended in 1% concentration in a naphthenic base mineral lubricating oil and tested for viscosity and V. I. characteristics, with the following results:

Table II

| Percent Tripolymer | Viscosity (c. s.) | | V. I. |
|---|---|---|---|
| | 100° F. | 210° F. | |
| 0 | 32.16 | 4.43 | 6.0 |
| 1 | 60.212 | 7.5022 | 93.5 |

It is thus apparent that this tripolymer is exceedingly effective in raising the V. I. of a naphthenic type lubricating oil base stock.

EXAMPLE 3

A copolymer was made from a mixture of 9% by weight of parachlorstyrene and 91% by weight of isobutylene, using the same procedure described in Example 1, and the resulting copolymer, which showed 1.01% chlorine by analysis contained 3.95% p-Cl styrene, and had an average molecular weight of about 50,000 and an intrinsic viscosity of about 1.7, was blended in several concentrations in the same type of paraffinic lubricating oil base stock as used in the test in Example 1, and the resulting blends were then tested for viscosity and V. I. characteristics, with the following results:

Table III

| Percent Copolymer | Viscosity (c. s.) | | V. I. |
|---|---|---|---|
| | 100° F. | 210° F. | |
| 1 | 101.9 | 15.72 | 139 |
| 3 | 243.5 | 35.83 | 137 |

The above data indicate that the parachlorstyrene-isobutylene copolymer showed almost the same V. I.-increasing efficiency as the corresponding parabrom copolymer used in Example 1, when tested in 1% concentration, but the parabrom copolymer of Example 1 was superior to the corresponding parachlor copolymer because it produced a lesser increase in viscosity for any particular increase in V. I.

EXAMPLE 4

10 ml. of parachlorstyrene was added to 100 ml. of liquid isobutylene, and to the resulting mixture was added 500 ml. of methylchloride and 100 gms. of solid carbon dioxide to serve as internal refrigerant and to maintain a reaction temperature of −78° C. To this reaction mixture was added 100 ml. of a catalyst solution consisting of 0.8% of AlCl₃ dissolved in methyl chloride. A polymer was formed as the catalyst was added. The product was washed with water and air dried, and the resulting copolymer was found to have a molecular weight of about 14,000. It was soluble in lubricating oil.

In carrying out this invention, it is also possible to condense the halostyrene-isobutylene copolymers with an alkyl halide having from 5 to 30 carbon atoms per molecule, such as amyl chloride, dodecyl chloride, octadecyl chloride, etc., or to alkylate with various olefins, such as isobutylene, amylene, diisobutylene, etc. or to condense such copolymer with saturated dihalohydrocarbons or alkylene dihalides, such as ethylene dichloride, dichlor paraffin wax, etc., or to condense with mono-, di-, or higher basic acyl halides such as acetyl chloride, stearyl chloride, succinyl chloride sebacyl chloride, phthalyl chloride and mixed products such as acid chlorides of coconut oil fatty acids, etc., or to react the copolymers with various mixed products containing mono and dihalogen substituted hydrocarbons, such as a chlorinated paraffin wax having a chlorine content of about 10–15%. Such alkylation and condensation reactions may not only be applied to the copolymers described above which are actually soluble in mineral lubricating oil but also to similar copolymers of even higher halogen content, such as those made by copolymerizing up to 50% or more of a monochlorstyrene with isobutylene, or up to 30% or so of a dichlorstyrene with isobutylene, which latter copolymerization is carried out in the presence of a third component consisting of styrene or an alkyl substituted styrene.

EXAMPLE 5

To 100 parts by weight of chlorinated paraffin wax (10.5% chlorine) were added 25 parts by weight of isobutylene-p-Cl styrene copolymer. (The copolymer was made at −103° C. by the use of AlCl₃ in CH₃Cl catalyst, contained 20% by weight of p-Cl styrene, and had a Staudinger molecular weight of 32,000.) The mixture was taken up in 50 parts of kerosene (based on chlorinated wax) to effect solution. AlCl₃ was now added in an amount of 2¼ parts and the mixture was agitated. Temperature was maintained at 90° F., during a reaction period of 12 hours and finally the catalyst was hydrolyzed by the addition of aqueous alkali. The product was added to an excess of 99% isopropyl alcohol to precipitate polymer.

EXAMPLE 6

The initial product as made in Examples 1 to 4 was further condensed with a dicarboxylic acid chloride. The second condensation was made as follows: About 100 grams of the wax condensation product were placed in 1,000 grams of tetrachlorethane as solvent. AlCl₃ (15 g.) was then added along with 10 grams of sebacyl chloride. Heating was continued at 80° C. for one hour. Catalyst was hydrolyzed just as before and the material was then removed from solution by adding to excess isopropyl alcohol, and tested with the following results:

| Per Cent Added | Material Added to Oil | Vis. (S. S. U.) 210° F. | V. I. | A. S. T. M. Pour Point ° F. |
|---|---|---|---|---|
| 0 | (Blank Oil) | 42.9 | 100 | 22 |
| 5 | Orig. copolymer | 57.4 | 133 | 22 |
| 5 | Wax cond. product of copolymer. | 50.0 | 136 | 0 |
| 5 | Sebacylated wax cond. prod. of copolymer. | 48.8 | 139 | −5 |

The data in the above table show that the original p-chlorstyrene-isobutylene copolymer (used as starting material in Example 5), when used in 5% concentration, improved the V. I. of the paraffinic lubricating oil base stock from 100 to 133 while raising the viscosity at 210° F. from 42.9 to 57.4 seconds, but had no effect on the 22° F. pour point of the oil base stock. The data also show that the condensation of that copolymer with chlorinated paraffin wax (as described in Example 5) made a product of further improved V. I. properties because in 5% concentration it produced a V. I. of 136, and did so with a lesser increase in viscosity of the base stock (from 42.9 to 50.0); and this wax-copolymer condensation product also had substantial pour depressing properties, as 5% of the additive reduced the A. S. T. M. pour point from 22° F. down to 0° F. Finally, the table also shows that the subsequent condensation of that wax-copolymer condensation product with sebacyl chloride still further improved the V. I. characteristics of the product, since in 5% concentration it now produced a V. I. of 139 and did so with a 210° F. viscosity of only 48.8 seconds, and slightly further lowered the pour point down to −5° F. These pour depressing properties are quite surprising because high molecular weight linear type hydrocarbon polymers and copolymers per se have no pour depressing characteristics at all, and it is difficult to impart such properties to them.

EXAMPLE 7

107 grams of "p-Cl styrene-isobutylene" copolymer (M. W. (Staudinger) was 18,400 and contained 12.8% combined p-Cl styrene) were added to 600 cc. of tetrachlorethane, and then 7.2 g. AlCl₃ were added to the solution. At 25°, 38 grams of amyl chloride were added. The temperature was increased to 120–125° F. The total time of reaction was 5 hours, the mixture being well agitated. The reaction was killed by the addition of 20 cc. of isopropyl alcohol. Solvent was removed from the condensation product by evaporation. Total weight of the water-washed and dried alkylated polymer was 122 grams. Staudinger M. W. of this plastic and elastic product was 12,100, and it was soluble in benzene, toluene and mineral oil. The sample was blended in a paraffinic lube oil and tested for V. I. and pour depressing properties with the following results:

| | Viscosity S. S. U. at 210 °F. | V. I. | Pour Point (°F.) |
|---|---|---|---|
| Base Oil | 44.4 | 114 | +14 |
| Base Oil+5% alkylated copolymer | 47.9 | 124 | +14 |

This example indicates that such a chlorstyrene-isobutylene copolymer can be alkylated in spite of its high molecular weight and in spite of the presence of the chlorine on the aromatic nucleus of the styrene, both of which factors tend to reduce the susceptibility of a material to alkylation with a lower alkyl halide. Such alkylated halogen-containing copolymers are new products. For use as lubricating oil additives, this feature of the invention can be more advantageously applied either to copolymers containing the same or lesser content of halostyrene but polymerized to a much higher molecular weight (e. g. 30,000 or 40,000 or higher), by use of lower temperature, e. g. −103° C., or stronger catalyst etc., or by applying the alkylation to a copolymer of similarly moderately high molecular weight (e. g. 10,000 to 20,000 or so) but containing a greater percentage of halogen.

By comparing Examples 5 and 7, it is noted that mere alkylation of chlorstyrene-isobutylene copolymer with amyl chloride (Example 7) does not impart pour depressing characteristics to the copolymer structure, whereas (Example 5) condensation with chlorinated paraffin wax of 10% chlorine (which contains some monochlor and some dichlor wax molecules) does impart pour depressing characteristics. This may be due to the combined effect of alkylation with higher alkyl groups (by the monochlor wax) and some interlinking (by the dichlor wax).

EXAMPLE 8

A copolymer of isobutylene and styrene was prepared in accordance with U. S. Patent 2,274,749. Temperature of polymerization was −101° C. and AlCl₃ methyl chloride catalyst was used. Another copolymer was prepared of isobutylene and parabromstyrene in accordance with Example 1. In each case the yield was about 80% by weight based on the monomers. The copolymers were dissolved, each in different samples of a paraffinic mineral lubricating oil base stock having a viscosity of 43 seconds Saybolt Universal at 210° F. and 112 viscosity index. The unhalogenated product went into solution in 4 hours, the halogenated product in 3 hours. Sufficient copolymer, 1%, was added in each case to raise the viscosity of the oil base stock 10 S. S. U. at 210° F. With the said quantity of copolymers added, V. I. was measured with the following results:

|  | 1% Styrene-Isobutylene | 1% Parabromstyrene-Isobutylene |
| --- | --- | --- |
| V. I. | 132 | 141 |

Thus blended to the same viscosity the halogenated product resulted in a blend with a higher viscosity index, clearly indicating a patentable improvement over the unhalogenated product. The methods used to polymerize the two copolymers tested, were the same.

In preparing lubricating compositions according to the present invention, in addition to using a mineral lubricating oil base stock and a V. I. improving amount of about 0.5-20%, preferably about 1-10%, of a high molecular weight haloaromaticolefin copolymer as described above, one may also use minor amounts of other known lubricating oil additives, such as dyes, oxidation inhibitors, sludge dispersers, pour depressors, grease-forming soaps, lubricity agents, corrosion inhibitors, detergent-type additives, anti-foaming agents, extreme pressure additives, etc.

This application is a continuation in part of the co-pending application, Serial No. 708,945, filed November 9, 1946, now abandoned.

It is not intended that this invention be limited to the specific materials and conditions which have been recited merely for the sake of illustration, but only by the appended claims.

We claim:

1. A process for the preparation of lubricating oil additives which comprises condensing with a halogenated aliphatic hydrocarbon containing from 5 to 30 carbon atoms a copolymer of para-chloro styrene and isobutylene in the presence of a Friedel-Crafts catalyst, said copolymer containing from about 1.0% to 30% by weight of para-chloro styrene having a molecular weight of more than 14,000, and having been copolymerized at a temperature below about −50° C. in the presence of a Friedel-Crafts catalyst.

2. A process for the preparation of lubricating oil additives which comprises condensing with a chlorinated paraffin wax containing from 10% to 15% chlorine, a copolymer of para-chloro styrene and isobutylene in the presence of a Friedel-Crafts catalyst, said copolymer containing from about 1.0% to about 30% by weight of parachloro styrene, having a molecular weight of more than 14,000, and having been prepared at a temperature below about −50° C. in the presence of a Friedel-Crafts catalyst.

3. A process according to claim 2 wherein the condensation reaction is carried out at a temperature of about 90° F. for a period of time of about 12 hours.

4. A process for the preparation of lubricating oil additives which comprises condensing with amyl chloride a copolymer of para-chloro styrene and isobutylene in the presence of a Friedel-Crafts catalyst, said copolymer containing about 1.0% to 30% by weight of para-chloro styrene, having a molecular weight of more than 14,000, and having been copolymerized at a temperature below about −50° C. in the presence of a Friedel-Crafts catalyst.

5. An improved lubricating oil additive which consists essentially of a Friedel-Crafts condensation product of a halogenated aliphatic hydrocarbon containing from 5 to 30 carbon atoms and a copolymer of parachloro styrene and isobutylene, said copolymer containing from 1.0% to 30% by weight of para-chloro styrene, having a molecular weight of more than 14,000, and having been copolymerized at a temperature below about −50° C. in the presence of a Friedel-Crafts catalyst.

6. An improved lubricating oil additive which consists essentially of a Friedel-Crafts condensation product of a chlorinated paraffin wax containing from 10% to 15% chlorine and a copolymer of para-chloro styrene and isobutylene, said copolymer containing from 1.0% to 30% by weight of parachloro styrene, having a molecular weight of more than 14,000 and having been copolymerized at a temperature of below about −50° C. in the presence of a Friedel-Crafts catalyst.

7. An improved lubricating oil additive which consists essentially of a Friedel-Crafts condensation product of amyl chloride and a copolymer containing from 10% to 15% chlorine and a copolymer of para-chloro styrene and isobutylene, said copolymer containing from 1.0% to 30% by weight of parachloro styrene, having a molecular weight of more than 14,000 and having been copolymerized at a temperature of below about −50° C. in the presence of a Friedel-Crafts catalyst.

JOHN D. GARBER.
DAVID W. YOUNG.

REFERENCES CITED

The following references are of record in the file of this patent:

UNITED STATES PATENTS

| Number | Name | Date |
| --- | --- | --- |
| 2,072,120 | Mikeska | Mar. 2, 1937 |
| 2,274,749 | Smyers | Mar. 3, 1942 |
| 2,321,896 | Britton | June 15, 1943 |
| 2,335,608 | Pings | Nov. 30, 1943 |
| 2,398,736 | Dreisbach | Apr. 16, 1946 |
| 2,414,330 | Renoll | Jan. 14, 1947 |
| 2,429,479 | Mikeska | Oct. 21, 1947 |
| 2,472,495 | Sparks et al. | June 7, 1949 |
| 2,479,450 | Young et al. | Aug. 16, 1949 |